(12) United States Patent
Roisin et al.

(10) Patent No.: US 8,846,140 B2
(45) Date of Patent: Sep. 30, 2014

(54) METHOD FOR PRODUCING AN OPTICAL ARTICLE COATED WITH AN ANTIREFLECTION OR A REFLECTIVE COATING HAVING IMPROVED ADHESION AND ABRASION RESISTANCE PROPERTIES

(71) Applicant: Essilor International (Compagnie Generale d'Optique), Charenton-le-Pont (FR)

(72) Inventors: Philippe Roisin, Charenton-le-Pont (FR); Michele Thomas, Charenton-le-Poont (FR)

(73) Assignee: Essilor International (Compagnie Generale d'Optique), Paris (FR)

( * ) Notice: Subject to any disclaimer, the term of this patent is extended or adjusted under 35 U.S.C. 154(b) by 0 days.

(21) Appl. No.: 13/657,569

(22) Filed: Oct. 22, 2012

(65) Prior Publication Data

US 2013/0071579 A1 Mar. 21, 2013

Related U.S. Application Data

(63) Continuation of application No. 12/036,060, filed on Feb. 22, 2008, now Pat. No. 8,318,245, which is a continuation-in-part of application No. 11/762,952, filed on Jun. 14, 2007, now abandoned.

(30) Foreign Application Priority Data

Feb. 23, 2007 (FR) ...................................... 07 53483

(51) Int. Cl.
*B05D 5/06* (2006.01)
*G02B 1/11* (2006.01)
*G02B 1/12* (2006.01)

(52) U.S. Cl.
CPC ................ *B05D 5/061* (2013.01); *G02B 1/115* (2013.01); *G02B 1/12* (2013.01)
USPC ........ 427/164; 427/165; 427/166; 427/248.1; 427/255.23; 427/331; 427/533

(58) Field of Classification Search
USPC .......... 427/162, 164, 248.1, 255.23, 331, 533
See application file for complete search history.

(56) References Cited

U.S. PATENT DOCUMENTS

| | | | |
|---|---|---|---|
| 4,815,962 A | 3/1989 | Cardone | 427/525 |
| 5,597,622 A | 1/1997 | Zoller et al. | 427/563 |
| 5,993,614 A | 11/1999 | Nomura | 204/192.12 |
| 6,495,203 B2* | 12/2002 | Anderson et al. | 427/166 |
| 2002/0197824 A1* | 12/2002 | Katsuragawa | 438/437 |
| 2004/0067351 A1 | 4/2004 | Helmstetter et al. | 428/212 |
| 2005/0064642 A1* | 3/2005 | Fujinawa et al. | 438/200 |
| 2005/0115923 A1* | 6/2005 | Lacan et al. | 216/26 |
| 2006/0051501 A1 | 3/2006 | Conte et al. | 427/162 |
| 2006/0257557 A1 | 11/2006 | Scherer et al. | 427/162 |
| 2007/0178315 A1* | 8/2007 | Thomas et al. | 428/426 |

FOREIGN PATENT DOCUMENTS

| | | |
|---|---|---|
| EP | 0699926 | 3/1996 |
| EP | 0834092 | 12/1996 |
| EP | 1306695 | 6/2006 |
| FR | 2713668 | 12/1994 |
| FR | 2847346 | 5/2004 |
| FR | 2859485 | 3/2005 |
| JP | 56-113101 | 9/1981 |
| JP | 05-034502 | * 2/1993 |
| JP | 11-258407 | 9/1999 |
| JP | 2000-338304 | 12/2000 |
| JP | 2001-293810 | 10/2001 |
| JP | 2002-328201 | 6/2002 |
| JP | 2005-231040 | 9/2005 |
| WO | WO 01/55752 | 8/2001 |
| WO | WO 02/44440 | 6/2002 |
| WO | WO 2005/059603 | * 6/2005 |

OTHER PUBLICATIONS

Office Communication issued in Japanese Patent Application No. 2009-550725, dated Jan. 24, 2012.

* cited by examiner

*Primary Examiner* — Elizabeth Burkhart
(74) *Attorney, Agent, or Firm* — Fulbright & Jaworski LLP

(57) ABSTRACT

The invention relates to a method for producing an optical article having antireflection or reflective properties and comprising a substrate having at least one main surface, comprising the step of depositing an sub-layer onto a substrate's main surface, the step of treating the sub-layer by ionic bombardment and the step of depositing onto said sub-layer a multi-layered stack comprising at least one high refractive index layer and at least one low refractive index layer. According to a preferred embodiment, the deposition of the sub-layer is conducted in a vacuum chamber in which a gas is supplied during the deposition step.

24 Claims, No Drawings

METHOD FOR PRODUCING AN OPTICAL ARTICLE COATED WITH AN ANTIREFLECTION OR A REFLECTIVE COATING HAVING IMPROVED ADHESION AND ABRASION RESISTANCE PROPERTIES

CROSS REFERENCE TO RELATED APPLICATIONS

This application is a continuation of U.S. Pat. No. 8,318, 245, filed Feb. 22, 2008, which is a continuation-in-part of U.S. patent application Ser. No. 11/762,952, filed Jun. 14, 2007, which claims priority to French Patent Application Ser. No. 0753483, filed February 23, 2007. The entire contents of all of the referenced applications are incorporated into the present application by reference.

BACKGROUND OF THE INVENTION

The present invention relates to a method for producing an optical article comprising a substrate provided with an anti-reflection coating or a reflective coating comprising a sub-layer, having in particular an increased abrasion-resistance and good adhesion properties to the substrate.

1. Field of the Invention

In the ophthalmic optics field, ophthalmic lenses are traditionally provided with various coatings so as to give these lenses a plurality of mechanical and/or optical properties. Successive coating layers are thus traditionally formed onto an ophthalmic lens, such as impact-resistant coating layers, abrasion-resistant coating layers, antireflection and/or reflective coating layers.

As defined hereunder, an antireflection coating means a coating that has been deposited onto the surface of an optical article, which does improve the antireflective properties of the optical end product. It makes it possible to reduce the light reflection at the article-air interface area within a relatively large portion of the visible light spectrum.

A reflective coating has the opposite effect, that is to say it does increase the light ray reflection. Such a coating type is used for example to provide sun lenses with a mirror effect.

1. Description of Related Art

Antireflection coatings are well known and do traditionally comprise a monolayered stack or a multilayered stack of dielectric materials such as SiO, $SiO_2$, $Al_2O_3$, $MgF_2$, LiF, $Si_3N_4$, $TiO_2$, $ZrO_2$, $Nb_2O_5$, $Y_2O_3$, $HfO_2$, $Sc_2O_3$, $Ta_2O_5$, $Pr_2O_3$, or mixtures thereof.

As is also well known, antireflection coatings are preferably multilayered coatings comprising high refractive index layers and low refractive index layers, alternately.

Reflective coatings are made of layers that are the same in nature as for antireflection coatings, except that the refractive index values, the number and the thickness of the layers are chosen so as the coating to be reflective, which is well known to the one skilled in the art.

Even if the following description does refer to antireflection coatings it also applies to reflective coatings. However, the present invention preferably relates to antireflection coatings.

It is known to interleave a relatively thick sub-layer between the substrate and the high refractive index and the low refractive index layers of the antireflection coating so as to improve the abrasion-resistance and/or the scratch resistance of said coating.

However, it has been observed that inserting this sub-layer, while increasing the abrasion resistance properties, might weaken the antireflection stack and affect its adhesion to the substrate. Some defaults have been observed in particular at the sub-layer/antireflection optical stack interface.

The patent application WO 2005/059603, in the name of to the applicant, does describe an article comprising a coloured, multilayered antireflection coating comprising at least two high refractive index layers that do absorb in the visible range and that are based on substoechiometric titanium oxide $TiO_x$ (x<2) and preferably at least one low refractive index layer (LI) based on $SiO_2$ doped with 1 to 5 weight % of $Al_2O_3$, as related to the total weight $SiO_2+Al_2O_3$.

This document does more particularly describe a substrate successively coated with a 100 to 110 nm-thick silica sub-layer, a $TiO_x$ layer, a $SiO_2/Al_2O_3$ layer, a $TiO_x$ layer, a $SiO_2/Al_2O_3$ layer, a $TiO_x$ layer, a $SiO_2/Al_2O_3$ layer and an anti-fouling coating.

Prior to depositing the antireflection coating, the substrate surface does undergo a treatment for increasing the sub-layer adhesion. This surface preparation, that is called IPC (Ion Pre-cleaning), does consist of an ionic pre-cleaning by argon ion bombarding the substrate with an ion gun.

There is no surface treatment provided for the sub-layer.

The optical article produced according to the teaching of the patent application WO 2005/059603 does possess good adhesion and abrasion resistance properties that might nevertheless be improved.

SUMMARY OF THE INVENTION

It is therefore an object of the present invention to provide a method for producing a transparent optical article, in particular an ophthalmic lens, comprising a substrate made of mineral or organic glass and an antireflection coating provided with an sub-layer, which does advantageously possess both improved abrasion resistance and adhesion properties as compared to the optical articles of the prior art.

This novel method should easily integrate into the usual production process for optical articles and should preferably avoid any heating of the substrate.

The prepared optical articles must retain excellent transparency properties, they must have a good resistance to a hot water dip treatment followed with a surface mechanical strain, et be free from any optical defect.

It is another object of the present invention to provide a method for producing such optical articles, further provided with antistatic properties.

The present invention has especially been conceived to counteract the difficulty of the antireflection stack to adhere to the substrate, while ensuring that solving this problem will proceed together with an increase in the abrasion resistance of said coating.

DETAILED DESCRIPTION

The aforementioned objectives are aimed at with the present invention by means of a method for producing an optical article having antireflection or reflective properties and comprising a substrate, said method comprising at least the steps of:

providing an optical article comprising a substrate having at least one main surface;

depositing onto a main surface of the substrate an sub-layer having an exposed surface;

depositing onto said exposed surface of the sub-layer a multilayered antireflection stack comprising at least one high refractive index layer and at least one low refractive index layer, recovering an optical article comprising a substrate having a main surface coated with an antireflection coating comprising said sub-layer and said multilayered stack, wherein the exposed surface of said sub-layer has been submitted to an ionic bombardment treatment prior to depositing said multilayered stack.

As used in this application, when an optical article does comprise one or more coating(s) on its surface, the phrase "depositing a layer or a coating onto the article" means that a layer or a coating is deposited onto the unprotected surface (exposed) of the article external coating.

As used herein, the "article external coating" means the coating that is the most distant from the substrate.

As used herein, a coating that is said to be "on" a substrate or that has been deposited "onto" a substrate is defined as being a coating (i) that is located above the substrate, (ii) that is not necessarily in contact with the substrate, that is to say one or more intermediate coating(s) may be located between the substrate and the coating of interest, and (iii) that does not necessarily totally cover the substrate, although a complete coverage is preferred.

As used herein, when "a layer 1 is located under a layer 2", it means that layer 2 is more distant from the substrate than layer 1 does.

As used herein, a "multilayered antireflection stack" means a multilayered stack of the antireflection coating that is deposited on the sub-layer of the antireflection coating. In the following description it will be simply referred to as the "multilayered stack."

The optical article prepared according to the invention comprises a substrate, preferably a transparent substrate, made of organic or mineral glass, having main front and rear faces, at least one of said main faces being provided with an antireflection coating with an undercoat covered with a multilayered stack and, preferably both main faces. Further preferably, the multilayered stack directly contacts the sub-layer.

Generally speaking, the sub-layer and the multilayered stack of the antireflection coating of the optical article according to the invention may be deposited onto any substrate, and preferably onto organic glass substrates such as for example a thermoplastic or a thermosetting material.

Thermoplastic materials that may be suitably used for the substrates include (meth)acrylic (co)polymers, especially methyl poly(methacrylate) (PMMA), thio(meth)acrylic (co) polymers, polyvinylbutyral (PVB), polycarbonates (PC), polyurethanes (PU), poly(thiourethanes), polyol allylcarbonate (co)polymers, thermoplastic copolymers of ethylene and vinyl acetate, polyesters such as polyethylene terephtalate (PET) or polybutylene terephtalate (PBT), polyepisulfides, polyepoxides, copolymers of polycarbonates and polyesters, copolymers of cycloolefins such as copolymers of ethylene and norbornene or ethylene and cyclopentadiene, and combinations thereof.

As used herein a "(co)polymer" means a copolymer or a polymer. A (meth)acrylate is an acrylate or a methacrylate.

The preferred substrates according to the invention include for example the substrates obtained by polymerizing alkyl (meth)acrylates, especially $C_1$-$C_4$ alkyl (meth)acrylates, such as methyl (meth)acrylate and ethyl (meth)acrylate, polyethoxylated aromatic (meth)acrylates such as polyethoxylated bisphenol di(meth)acrylates, allyl derivatives such as aliphatic or aromatic, linear or branched polyol allylcarbonates, thio(meth)acrylates, episulfides and precursor mixtures of polythiols and polyisocyanates (for obtaining polythiourethanes).

As used herein a "polycarbonate" (PC) means both the homopolycarbonates and the copolycarbonates and the block copolycarbonates. Polycarbonates are commercially available for example from GENERAL ELECTRIC COMPANY under the trade name LEXAN®, from TEIJIN under the trade name PANLITE®, from BAYER under the trade name BAYBLEND®, from MOBAY CHEMICHAL Corp. under the trade name MAKROLON® and from DOW CHEMICAL Co. under the trade name CALIBRE®.

Suitable examples of polyol allyl carbonate (co)polymers include (co)polymers of ethylene glycol bis (allyl carbonate), of diethylene glycol bis 2-methyl carbonate, of diethylene glycol bis (allyl carbonate), of ethylene glycol bis (2-chloro allyl carbonate), of triethylene glycol bis (allyl carbonate), of 1,3-propanediol bis (allyl carbonate), of propyleneglycol bis (2-ethyl allyl carbonate), of 1,3-butenediol bis (allyl carbonate), of 1,4-butenediol bis (2-bromo allyl carbonate), of dipropyleneglycol bis(allyl carbonate), of trimethylene glycol bis (2-ethyl allyl carbonate), of pentamethylene glycol bis (allyl carbonate), of isopropylene bisphenol-A bis (allyl carbonate).

Particularly recommended substrates are those substrates obtained by (co)polymerizing bis allyl carbonate of diethylene glycol, marketed, for example, under the trade name CR-39® by PPG Industries (ESSILOR ORMA® lenses).

The particularly recommended substrates also include those substrates obtained by polymerizing thio(meth)acrylic monomers, such as those described in the French patent application FR 2734827.

Of course the substrates may be obtained by polymerizing mixtures of the hereabove mentioned monomers, or they also may comprise mixtures of such polymers and (co)polymers.

Generally speaking, the preferred substrates are those made of a crosslinked material (thermosetting materials), especially allylic, (meth)acrylate type, thio(meth)acrylate type or poly(thio)urethane substrates.

The organic substrates that are preferred in the context of the present invention are those which thermal expansion coefficient does range from $50.10^{-6\circ}$ $C.^{-1}$ to $180.10^{-6\circ}$ $C.^{-1}$, and preferably from $100.10^{-6\circ}$ $C.^{-1}$ to $180.10^{-6\circ}$ $C.^{-1}$.

According to one embodiment of the present invention, the substrate comprises a front face and a rear face, wherein the antireflection coating may be deposited onto at least one of the two faces. It is preferably deposited onto the front and rear faces of the substrate.

As used herein, the "rear face" (typically concave) of the substrate means the face which, when abrasioning the article, is located the nearest to the abrasioner's eye. On the contrary, the "front face" (typically convex) of the substrate means the face which, when abrasioning the article, is the most distant from the abrasioner's eye.

Before depositing the sub-layer onto the substrate, optionally coated with, for example, an abrasion-resistant and/or an anti-scratch layer, the surface of said substrate is usually submitted to a treatment for increasing the adhesion of the sub-layer which is typically conducted under vacuum, such as a bombardment with energetic species, for example an ion beam ("Ion Pre-Cleaning" or "IPC"), a corona discharge, an ion spallation treatment or a plasma treatment under vacuum. Thanks to these cleaning treatments, the cleanness of the substrate surface is optimized. An ion bombardment treatment is preferred, which preferably uses argon, oxygen, or mixtures thereof as the ionized gas, under an acceleration voltage typically ranging from 50 to 200 V and an intensity typically ranging from 1 A to 4 A.

As used herein, the "energetic species" are species defined as having an energy ranging from 1 to 150 eV, preferably from 10 to 150 eV, and more preferably from 40 to 150 eV. The energetic species may be chemical species such as ions, radicals or species such as photons or electrons.

As used herein, an "ion bombardment" is defined as a bombardment with ions having an energy higher than or equal to 30 eV, preferably higher than or equal 40 eV.

According to the present invention, a sub-layer is used in association with a multilayered stack comprising at least one high refractive index layer and at least one low refractive index layer.

As used herein, a "sub-layer" or bonding layer means a coating which is deposited onto the substrate (bare or coated) prior to depositing the multilayered stack of the invention. The sub-layer must be sufficiently thick in order to promote the antireflection coating abrasion resistance, but preferably not to such an extent that it would generate a light absorption that would significantly decrease the luminous transmittance τV.

Because it is relatively thick, the sub-layer does not typically take part to the antireflection optical activity, especially where it has a refractive index similar to that of the substrate or the coated substrate.

The sub-layer preferably comprises a $SiO_2$-based layer, the thickness of which is preferably greater than or equal to 75 nm, more preferably greater than or equal to 80 nm, more preferably greater than or equal to 100 nm and most preferably greater than or equal to 150 nm. Its thickness is typically below 250 nm, more preferably below 200 nm. According to a particular embodiment, the sub-layer consists in said above referred $SiO_2$-based layer.

Preferably, the $SiO_2$-based layer of the sub-layer which may be a $SiO_2$ layer, directly contacts the multilayered stack.

Said $SiO_2$-based layer may comprise, in addition to silica, one or more other materials traditionally used for making sub-layers, for example one or more materials selected from the hereabove described dielectric materials. Such $SiO_2$-based layer is preferably free from $Al_2O_3$, more preferably consists in a $SiO_2$-layer.

The sub-layer of the invention preferably comprises at least 70 weight % of $SiO_2$, more preferably at least 80 weight % and most preferably at least 90 weight % of $SiO_2$. As already mentioned, in an optimal embodiment of the invention said sub-layer comprises 100 weight % of silica.

A monolayered type sub-layer will be preferably used. However, the sub-layer may be laminated (multilayer). In that case, it will comprise at least one $SiO_2$-based layer which thickness is preferably greater than or equal to 75 nm and that is preferably free from $Al_2O_3$ and coming preferably into direct contact with the multilayered stack.

The multilayered sub-layer preferably comprises a $SiO_2$ layer that is free from $Al_2O_3$ and which thickness is preferably greater than or equal to 75 nm, more preferably greater than or equal to 80 nm, even more preferably greater than or equal to 100 nm and most preferably greater than or equal to 150 nm and at most three layers, preferably at most two layers, that are inserted between the optionally coated substrate and this $SiO_2$ layer free from $Al_2O_3$.

Especially when the substrate has a high refractive index (that is to say a refractive index greater than or equal to 1.55, preferably greater than or equal to 1.57) and when the sub-layer is directly deposited on the substrate or the substrate is coated with an abrasion-resistant and/or an anti-scratch coating having a high refractive index (that is to say greater than or equal to 1.55, preferably greater than or equal to 1.57), preferably based on epoxysilanes, and the sub-layer is directly deposited on this abrasion-resistant and/or anti-scratch coating, the sub-layer preferably comprises, in addition to the aforementioned $SiO_2$ layer, a layer having a high refractive index and a weak thickness, lower than or equal to 80 nm, more preferably lower than or equal to 50 nm and even more preferably lower than or equal to 30 nm.

Such layer having a high refractive index does directly contact the high refractive index substrate or the high refractive index abrasion-resistant coating.

Alternatively, the sub-layer comprises, in addition to the aforementioned $SiO_2$ layer and the aforementioned high refractive index layer, a layer made of a low refractive index material (that is to say lower than or equal to 1.54, preferably lower than or equal to 1.52, more preferably lower than or equal to 1.50) based on $SiO_2$, free from $Al_2O_3$ or not, onto which the high refractive index layer is deposited.

In that case, the sub-layer typically comprises a 25 nm-thick $SiO_2$ layer, a 10 nm-thick $ZrO_2$ layer, a 160 nm-thick $SiO_2$ layer that have been deposited in this order starting from the substrate optionally coated with one or more functional coating(s).

In this application, a layer belonging to the multilayered stack of the antireflection coating (AR) is said to be a high refractive index layer (HI) when its refractive index is greater than or equal to 1.6, preferably greater than or equal to 1.7, more preferably greater than or equal to 1.8 and even more preferably greater than or equal to 1.9. A layer belonging to the multilayered stack of the antireflection coating is said to be a low refractive index layer (LI) when its refractive index is lower than or equal to 1.54, preferably lower than or equal to 1.52, more preferably lower than or equal to 1.50.

Unless otherwise specified, the refractive indices which it is referred to in the present invention are expressed at 25° C. for a wavelength of 550 nm.

The HI layers are usual high refractive index layers, that are well known in the art. They do typically comprise one or more mineral oxide(s) such as, without limitation, zirconia ($ZrO_2$), titanium oxide ($TiO_2$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Dy_2O_5$, $Nb_2O_5$, $Y_2O_3$. Optionally, the high index layers may further comprise silica or alumina, provided that their refractive index is greater than or equal to 1.6, preferably greater than or equal to 1.7, more preferably greater than or equal to 1.8. $TiO_2$, $PrTiO_3$, $ZrO_2$ and mixtures thereof are the most preferred materials.

According to a particular embodiment of the invention, at least one HI layer of the multilayered stack is a layer based on $TiO_2$, the high refractive index of which is particularly interesting. It is preferably deposited by ion assisted deposition (IAD), which increases the compression of this layer and thus its refractive index.

According to another particular embodiment of the invention, at least one HI layer of the multilayered stack is a layer based on $PrTiO_3$, the high heat resistance of which is particularly interesting.

The LI layers are well known as well and may comprise, without limitation, $SiO_2$, $MgF_2$, $ZrF_4$, $AlF_3$, chiolite ($Na_5Al_3F_{14}$), cryolite ($Na_3[AlF_6]$), and mixtures thereof, preferably $SiO_2$ or $SiO_2$ doped with alumina, the latter contributing to increasing the heat resistance of the antireflection coating. Obviously, mixtures of such compounds with optionally one or more other material(s) selected from the dielectric materials as previously described in this description are such that the refractive index of the resulting layer is as defined hereabove ($\leq 1.54$).

Depositing the low refractive index layers of the multilayered stack is preferably conducted in a vacuum chamber with no gas supply in the vacuum chamber during said deposition, especially with no oxygen added, that is to say without regulating pressure.

LI layers are thus obtained, which density is higher than the $SiO_2$-based layer of the sub-layer when the latter is deposited under gas supply as will be described hereafter.

This gas supply differs from an IAD treatment that will be described later on, in which the layer does undergo an activated species beam bombardment such as with ions.

When using a LI layer comprising a combination of $SiO_2$ and $Al_2O_3$, it preferably comprises from 1 to 10%, more preferably from 1 to 8% and even more preferably from 1 to 5 weight % of $Al_2O_3$ as related to the total weight of $SiO_2$+ $Al_2O_3$ in this layer. An excess of alumina could be detrimental to the AR coating adherence.

For example, $SiO_2$ doped with 4% by weight of $Al_2O_3$, or less, or $SiO_2$ doped with 8% of $Al_2O_3$ may be used. Commercially available $SiO_2/Al_2O_3$ mixtures may be used, such as LIMA® marketed by Umicore Materials AG (refractive index n=1.48-1.50 at 550 nm), or L5® substance marketed by Merck KGaA (refractive index n=1.48 at 500 nm).

According to a preferred embodiment, at least one LI layer of the multilayered stack comprises a mixture of $SiO_2$ and $Al_2O_3$, and preferably consists of a mixture of $SiO_2$ and $Al_2O_3$. According to another preferred embodiment, all the LI layers of the multilayered stack comprise a mixture of $SiO_2$ and $Al_2O_3$, and preferably consist of a $SiO_2$ and $Al_2O_3$ mixture. In the latter case, it is particularly preferred when the sub-layer does comprise at least one $SiO_2$-based layer free from $Al_2O_3$ which thickness is preferably greater than or equal to 75 nm.

Without wishing to be bound by theory, the applicants think that substituting in the sub-layer the pure silica with alumina-doped silica, when several, or even all the LI layers of the multilayered stack comprise a $SiO_2$ and $Al_2O_3$ mixture, excessively increases the compressive stress of the antireflection coating as a whole, which typically leads to adhesion problems and to a loss of abrasion resistance.

Typically, the HI layers have a physical thickness varying from 10 to 120 nm, and the LI layers have a physical thickness varying from 10 to 100 nm.

Preferably, the total physical thickness of the antireflection coating is lower than 1 micrometer, more preferably lower than or equal to 500 nm and even more preferably lower than or equal to 250 nm. The total physical thickness of the antireflection coating is typically higher than 100 nm, preferably higher than 150 nm. The thickness values mentioned in this application are physical thickness values, unless otherwise noted.

More preferably, the multilayered stack comprises at least two low refractive index layers (LI) and at least two high refractive index layers (HI). Preferably, the multilayered stack total number of layers is less than or equal to 8, more preferably less than or equal to 6.

HI layers and LI layers do not necessarily alternate in the stack, although they may alternate according to one embodiment of the present invention. Two HI layers (or more) may be deposited onto each other, as well as two LI layers (or more) may be deposited onto each other. Thus, it may be interesting as regards the abrasion resistance or even from the optical point of view to stack each other for example a $ZrO_2$ HI layer and a $TiO_2$ HI layer, rather than using one $TiO_2$ layer instead of these two adjacent HI layers.

Preferably, the sub-layer is adjacent to a high refractive index layer (HI) of the multilayered stack.

According to another preferred characteristic, the external layer of the multilayered stack, that is to say its coating that is the most distant from the substrate, is a layer comprising a mixture of silicon dioxide and aluminum oxide.

The various layers forming the multilayered stack, the so called "optical layers", and the sub-layer are preferably deposited by vacuum deposition according to any of following methods: i) by evaporation, optionally ion beam assisted; ii) by ion beam sputtering; iii) by cathode sputtering; iv) by plasma-assisted chemical vapour deposition. These different methods are described in "Thin Film Processes" and "Thin Film Processes II," Vossen & Kern, Ed., Academic Press, 1978 and 1991, respectively. Said evaporation under vacuum is a particularly recommended method.

All antireflection coating layers are preferably deposited by evaporation under vacuum. It is an advantage of such a method to avoid heating of the substrate, which is particularly interesting for organic glasses.

It is possible to conduct a treatment step with energetic species such as previously defined, in particular with ions, while concomitantly depositing one or more different layer(s) of the antireflection coating, except preferably the $SiO_2$-based layer of the sub-layer. Depositing one or more layer(s) of the multilayered stack and of the sub-layer may in particular be conducted under ion assistance ("IAD method"=Ion Assisted Deposition), the $SiO_2$-based layer of the sub-layer, which may be a $SiO_2$ layer being preferably deposited without ion assistance. The ion assistance method consists in compacting said layers with heavy ions, while they are being formed so as to increase their density. In addition to a densification, it enables to improve the adherence of the deposited layers and to increase their refractive index.

According to a crucial characteristic of the method according to the invention, the exposed surface of the sub-layer is submitted to an ionic bombardment treatment before depositing the multilayered stack. In the case of a multilayered sub-layer, the surface which undergoes such treatment is of course the one which will contact the multilayered stack of the invention in the final optical article.

This treatment is typically conducted under vacuum, by using for example an argon ion beam generated by means of an ion gun. The present inventors did surprisingly observe that it makes it generally possible on one hand to improve the abrasion resistance properties of the antireflection coating and on the other to increase its adhesion properties, especially the adhesion of the multilayered stack to the sub-layer.

These abrasion resistance properties may be evaluated using the BAYER tests that will be described in the experimental part. The adhesion properties of the antireflection coating layers to the substrate may be evaluated using a test ordinarily called "n×10 blow", also described in the experimental part. A test consisting in dip treating the final optical article into hot water followed with a superficial mechanical strain can for its part be used for evaluating the adhesion of the external layer of the multilayered stack to the rest of the antireflection coating. The external layer of the multilayered stack (that is to say of the antireflection coating) is the optical article layer that is the most likely to encounter adhesion problems.

However, it has been observed sometimes that the presence of the sub-layer might result for some layers of the antireflection coating in a loss of adhesion, despite the improvement of its abrasion resistance properties.

Surprisingly, the present inventors found that this adhesion problem could be solved by supplying gas during the deposition step of the sub-layer in a vacuum chamber. Concretely, a gas such as a rare gas for example argon, krypton, xenon, neon, gas such as oxygen, nitrogen, or mixtures of two gases or more amongst these, is or are introduced into the vacuum deposition chamber during the deposition of the sub-layer. Preferably, the gas employed during this step is not an activated gas, more preferably not an ionized gas.

This gas supply makes it possible to regulate the pressure and differs from an ionic bombardment treatment, such as ion assistance.

Deposition of the sub-layer does not involve any ion bombardment treatment such as ion assistance. Deposition of the sub-layer does preferably not involve any treatment with a plasma, the species of which have an energy higher than or equal to 30 eV. More preferably, deposition of the sub-layer does not involve any plasma treatment. Still preferably, deposition of the sub-layer does not involve any treatment with ions having an energy lower than or equal to 30 eV.

Typically, the pressure during the supply of the one or more gas(es) may vary from $5.10^{-5}$ to $2.10^{-4}$ mbar, preferably from $8.10^{-5}$ to $2.10^{-4}$ mbar, even better from $8.10^{-5}$ to $1.5.10^{-4}$ mbar.

Changing the deposition method (gas supply during the deposition of the sub-layer) enables to improve the adhesion in particular at the interface between the sub-layer and the multilayered stack, and the adhesion of the external layer to the multilayered stack.

Without wishing to be bound by any particular theory, the present inventors think that depositing the sub-layer with no gas supply results in a more dense layer, which can lead to an excessive stress (compression) of the antireflection coating and thus to an impairment of its adhesion properties. Depositing the sub-layer under gas pressure regulation, that is to say while concomitantly supplying gas to the deposition chamber, would enable to limit the rise in compressive stress and to avoid a structural weakening for the antireflection coating. It can be envisaged that such a procedure could result in a more porous sub-layer that would develop less stress.

IAD and ion treatment surface preparation operations of the substrate and/or the sub-layer may be conducted by means of an ion gun (Commonwealth Mark II type for example); wherein ions are particles consisting of gas atoms of which one or more electron(s) have been extracted. They preferably consist in bombarding the surface to be treated with argon ions ($Ar^+$), which current density ranges from 10 to 100 $\mu A/cm^2$ onto the activated surface and under a residual pressure in the vacuum chamber typically varying from $8.10^{-5}$ mbar to $5.10^{-4}$ mbar, preferably from $8.10^{-5}$ to $2.10^{-4}$ mbar.

It is well known that optical articles tend to become charged with static electricity, particularly when being cleaned under dry conditions by rubbing their surface with a cloth, a piece of synthetic foam or polyester. They can then draw and fix the small particles in their vicinity such as dusts, and this goes on for all the time the charge remains on the article. It is well known in the state of the art that an article may acquire antistatic properties thanks to the presence on its surface of an electrically conductive layer. This method has been applied in patent application WO 01/55752 and in patent EP 0834092.

An article is said to be "antistatic" when it does possess the ability not to retain and/or develop an appreciable electrostatic charge. An article is typically considered as having acceptable antistatic properties when it does not draw and fix dust as well as small particles after one of its surfaces was rubbed by means of a suitable cloth.

There are various methods for quantifying the antistatic properties of a material.

One of such methods does take the material's static potential into account. When the material's static potential (as measured when the article is still uncharged) is 0 KV +/− 0.1 KV (absolute value), the material is said to be antistatic, on the contrary when its static potential is different from 0 KV +/− 0.1 KV (absolute value), the material is said to be static.

According to another method, the ability for a glass to discharge a static charge after rubbing with a cloth or by any other means suitable for generating an electrostatic charge (corona-applied charge) may be quantified by measuring the dissipation time of said charge. Thus, antistatic glasses do have a discharge time that is about a hundred milliseconds, while it is about several tens of seconds for a static glass.

The article of the invention may be made antistatic by incorporating at least one electrically conductive layer into the multilayered stack. The electrically conductive layer may be located in various locations of the antireflection coating, provided its antireflection properties are not impaired. It can be deposited for example onto the sub-layer of the invention and form the first layer of the multilayered stack. It is preferably located under a low refractive index layer of the multi-layered stack.

The electrically conductive layer must be thin enough not to impair the transparency of the antireflection coating. Typically, its thickness does vary from 0.1 to 150 nm, more preferably from 0.1 to 50 nm, depending on its nature. When it is less than 0.1 nm thick, it does not typically enable to obtain a sufficient electrical conductivity, on the contrary when it is more than 150 nm thick, it does not typically enable to obtain the required transparency and low absorption characteristics.

The electrically conductive layer is preferably made of an electrically conductive and highly transparent material. In that case, its thickness does preferably vary from 0.1 to 30 nm, more preferably from 1 to 20 nm and even more preferably from 1 to 10 nm. The electrically conductive layer preferably comprises a metal oxide selected from indium, tin, and zinc oxide, as well as mixtures thereof. Indium-tin oxide ($In_2O_3$: Sn, i.e. indium oxide doped with tin) and tin oxide ($In_2O_3$) are preferred. According to an optimal embodiment, the electrically conductive and optically transparent layer is a indium-tin oxide layer, referred to as ITO layer.

Typically, the electrically conductive layer does contribute to obtain the antireflection properties and form a high refractive index layer in the antireflection coating. That is the case when layers are made of an electrically conductive and highly transparent material such as the ITO layers.

The electrically conductive layer may also be a layer made of a very thin noble metal that is typically less than 1 nm thick, more preferably less than 0.5 nm thick.

Particularly advantageously, the antireflection coating multilayered stack comprises at least four dielectric layers, preferably four or five, and optionally an electrically conductive layer which gives the article antistatic properties.

According to a preferred embodiment, a $SiO_2$ sub-layer with a thickness preferably greater than or equal to 75 nm, a $ZrO_2$ layer, typically with a thickness ranging from 10 to 40 nm and preferably from 15 to 35 nm, a $SiO_2$ layer or a $SiO_2/Al_2O_3$ layer, preferably a $SiO_2/Al_2O_3$ layer with a thickness typically ranging from 10 to 40 nm and preferably from 15 to 35 nm, a $TiO_2$ layer, typically with a thickness ranging from 40 to 150 nm and preferably from 50 to 120 nm, a $ZrO_2$ layer, typically with a thickness ranging from 8 to 30 nm and preferably from 10 to 25 nm, optionally an electrically conductive layer, preferably an ITO layer, typically with a thickness ranging from 0.1 to 30 nm and preferably from 1 to 20 nm, and a $SiO_2$ layer or $SiO_2/Al_2O_3$ layer, preferably a $SiO_2/Al_2O_3$ layer, typically with a thickness ranging from 40 to 150 nm and preferably from 50 to 100 nm are successively deposited starting from the substrate surface.

It is preferred that the multilayered stack of the invention does comprise an electrically conductive layer, and more preferably, that the article of the invention does comprise a stack TiO$_2$/ZrO$_2$/electrically conductive layer, the first mentioned layer being the nearest to the substrate.

According to a particularly preferred embodiment, a SiO$_2$ sub-layer with a thickness greater than or equal to 120 nm, a ZrO$_2$ layer with a thickness ranging from 20 to 30 nm, a SiO$_2$/Al$_2$O$_3$ layer with a thickness ranging from 20 to 40 nm, a TiO$_2$ layer with a thickness ranging from 75 to 110 nm, a ZrO$_2$ layer with a thickness ranging from 8 to 20 nm, an ITO layer with a thickness ranging from 2 to 20 nm, and a SiO$_2$/Al$_2$O$_3$ layer with a thickness ranging from 60 to 90 nm are successively deposited, starting from the substrate surface.

The electrically conductive layer, that is typically a high refractive index layer of the antireflection stack, may be deposited according to any suitable method, for example by vacuum deposition, by evaporation, preferably by ion beam assisted deposition (IAD), or by a cathode sputtering or ion beam method.

When present, the three successive TiO$_2$/ZrO$_2$/electrically conductive layer (preferably ITO) layers are preferably all three deposited under ion assistance (IAD).

The sub-layer and the multilayered stack may be directly deposited onto a bare substrate. In some applications, it is preferred that the substrate's main surface be coated with an impact-resistant primer layer, with an abrasion-resistant and/or an anti-scratch layer, or first with an impact-resistant primer layer, then with an abrasion-resistant and/or an anti-scratch layer, in this order. Other coatings that are traditionally used in the optics field may also be employed, for example a polarized coating, a photochromic coating or a coloured coating.

The sub-layer and the multilayered stack are preferably deposited onto an abrasion-resistant and/or an anti-scratch coating. The abrasion-resistant and/or anti-scratch coating may be any layer traditionally used as an abrasion-resistant and/or an anti-scratch coating in the field of ophthalmic lenses.

The abrasion-resistant and/or anti-scratch coatings are preferably hard coating based on poly(meth)acrylates or silanes.

The hard abrasion-resistant and/or anti-scratch coatings are preferably produced from compositions comprising at least one alkoxysilane and/or one hydrolysate thereof, obtained for example by hydrolysis with a hydrochloric acid solution. After the hydrolysis step, which duration does typically range from 2 h to 24 h, preferably from 2 h to 6 h, catalysts may optionally be added. A surfactant compound is preferably also added so as to optimize the optical quality of the deposition.

Recommended coatings according to the present invention include coatings based on epoxysilane hydrolysates such as those described in the patents FR 2,702,486 (EP 0,614,957), U.S. Pat. No. 4,211,823 and U.S. Pat. No. 5,015,523.

A preferred abrasion-resistant and/or antiscratch coating composition is the one disclosed in the French patent FR 2,702,486, in the name of the applicant. It comprises an epoxy trialkoxysilane and dialkyl dialkoxysilane hydrolysate, colloidal silica and a catalytic amount of a curing catalyst based on aluminum such as aluminum acetyl acetonate, the rest being for the most part solvents that are traditionally used for formulating such compositions. Preferably the hydrolysate used is a γ-glycidoxypropyl trimethoxysilane (GLYMO) and dimethyldiethoxysilane (DMDES) hydrolysate.

The abrasion-resistant and/or anti-scratch coating composition may be deposited onto the substrate's main surface by dipping or spin-coating. It is then cured according to the appropriate method (preferably a thermal or an ultraviolet method).

The thickness of the abrasion-resistant and/or antiscratch coating does typically vary from 2 to 10 μm, preferably from 3 to 5 μm.

Before depositing the abrasion-resistant and/or antiscratch coating, a primer coating may be deposited onto the substrate to improve the impact resistance and/or the adhesion of the following layers in the final product.

This coating may be any impact-resistant primer layer traditionally used for articles made of a transparent polymeric material, such as ophthalmic lenses.

Preferred primer compositions include compositions based on thermoplastic polyurethanes, such as those described in the Japanese patents JP 63-141001 and JP 63-87223, the poly(meth)acrylic type primer compositions, such as those described in the American patent U.S. Pat. No. 5,015,523, thermosetting polyurethane based compositions, such as those described in the European patent EP 0404111 and compositions based on poly(meth)acrylic type latex or polyurethane type latex, such as those described in the patents U.S. Pat. No. 5,316,791 and EP 0680492.

The preferred primer compositions are compositions based on polyurethanes and compositions based on latex, especially polyurethane type latices.

Poly(meth)acrylic type latices are copolymer latices mainly based on a (meth)acrylate, such as for example ethyl, butyl, methoxyethyl or ethoxyethyl (meth)acrylate, with a typically minor amount of at least one other co-monomer, such as for example styrene.

Preferred poly(meth)acrylic type latices are latices based on acrylate-styrene copolymers. Such latices of acrylate-styrene copolymers are commercially available from ZENECA RESINS under the trade name NEOCRYL®.

Polyurethane type latices are also known and commercially available. As an example, polyurethane type latices with polyester units are appropriate. Such latices are also marketed by ZENECA RESINS under the trade name NEOREZ® and by BAXENDEN CHEMICALS under the trade name WITCOBOND®.

Mixtures of these latices may also be used in the primer compositions, especially polyurethane type and poly(meth) acrylic type latices.

These primer compositions may be deposited on the article faces by dipping or spin-coating, then be dried at a temperature of at least 70° C. and up to 100° C., preferably of about 90° C., during a time period ranging from 2 minutes to 2 hours, typically of about 15 minutes, to form primer layers which post-curing thickness does range from 0.2 to 2.5 μm, preferably from 0.5 to 1.5 μm.

Of course, the optical article according to the invention may also comprise coatings formed on the antireflection coating that might be able to modify its surface properties, such as hydrophobic coatings and/or oleophobic coatings (anti-fouling top coat). These coatings are preferably deposited onto the antireflection coating external layer. Their thickness is generally lower than or equal to 10 nm, and does preferably range from 1 to 10 nm, more preferably from 1 to 5 nm.

They are generally fluorosilane or fluorosilazane type coatings. They may be obtained by depositing a fluorosilane or fluorosilazane precursor, comprising preferably at least two hydrolysable groups per molecule. Fluorosilane precursors preferably have fluoropolyether moieties and more preferably perfluoropolyether moieties. These fluorosilanes are well known and are described, inter alia, in the patents U.S.

Pat. Nos. 5,081,192, 5,763,061, 6,183,872, 5,739,639, 5,922,787, 6,337,235, 6,277,485 and EP 0933377.

Typically, an optical article obtained according to the method of the invention comprises a substrate that is successively coated with an impact-resistant primer layer, an abrasion-resistant and/or an antiscratch layer, an sub-layer of the invention, a multilayered stack of the invention and a hydrophobic and/or oleophobic coating. The article of the invention is preferably an optical lens, more preferably an ophthalmic lens for spectacles, or an optical or ophthalmic lens blank. The lens may be a polarized lens or a photochromic lens or a coloured lens.

The coloration may be obtained by incorporating pigments into the lens mass, by impregnation, par depositing coloured layers that do absorb in the visible region.

Especially, one or more antireflection coating layer(s) obtained according to the method of the invention may be absorbent, for example substoichiometric titanium oxide $TiO_x$ (x<2)-based layers such as those described in the patent application WO 2005/059603, in the name of the applicant.

Preferably, the optical article obtained according to the method of the invention does not absorb in the visible region or only slightly, which means the context of the present application that its visible light transmission factor $\tau_v$, also called visible luminous transmittance, is higher than 90%, more preferably higher than 95%, even more preferably higher than 96% and most preferably higher than 97%.

The factor τv has an international standardized definition (ISO Standard 13666:1998) and is measured in accordance with the ISO Standard 8980-3. It is defined within the wavelength limits ranging from 380 to 780 nm.

Preferably, the light absorption of the coated article of the invention is lower than or equal to 1%.

More preferably, the mean reflection factor in the visible region (from 400 to 700 nm) of an article coated with an antireflection coating of the invention, noted $R_m$, is lower than 2.5% per article face, more preferably is lower than 2% per article face and even more preferably is lower than 1% per article face. In an optimal embodiment, the article comprises a substrate the two main surfaces of which are coated with an antireflection coating according to the invention and has a $R_m$ total value (cumulative reflection values due to the two faces) lower than 1%, preferably ranging to 0.7 to 0.8%. Methods for obtaining such $R_m$ values are well known to the one skilled in the art.

In this application, the "mean reflection factor" is such as defined in the ISO Standard 13666:1998, and measured in accordance with the ISO Standard 8980-4, that is to say it is the spectrum reflection average of the visible light spectrum as a whole between 400 and 700 nm.

The following examples illustrate the invention in more detail but without limitation.

EXAMPLES

1. General Procedures

Optical articles employed in the examples comprise a substrate ORMA® ESSILOR lens having a 65 mm diameter, with a power of −2.00 dioptres and a thickness of 1.2 mm, coated on both faces with an abrasion-resistant and/or an antiscratch coating (hard coat) disclosed in example 3 of the patent EP 0614957 (refractive index 1.50), based on a hydrolysate of GLYMO and DMDES, of colloidal silica and aluminum acetyl acetonate, with an antireflection coating and lastly with an anti-fouling coating.

The abrasion-resistant coating was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellosolve. The composition also comprised 0.1% of the surfactant FLUORAD™ FC-430® (3M) by weight as related to the total weight de the composition. This abrasion-resistant coating was deposited directly onto the substrate.

The sub-layers and the multilayered stack layers of the antireflection coating were deposited on both faces of the lenses (convex and concave) without heating of the substrates by evaporation under vacuum; the evaporation was optionally ion beam assisted where indicated (evaporation source: electron gun).

The $SiO_2/Al_2O_3$ mixture used in some examples is the substance L5® marketed by Merck KGaA. Silica $SiO_2$ employed for evaporation was supplied by OPTRON and appears as granulates having a size of 1 to 2 mm.

The anti-fouling coating was obtained by evaporation under vacuum of the Optool DSX® compound marketed by Daikin Industries (thickness: from 2 to 5 nm).

The deposition frame was a Leybold 1104 equipment (except for example 6) provided with an electron gun ESV14 (8 kV) for evaporating the oxides, with a Joule effect pot for depositing the top coat and with an ion gun (Commonwealth Mark II) for the preliminary phases for preparing the substrate surface (IPC) and the sub-layer with argon ions, as well as for depositing layers under ion assistance (IAD). In example 6, the deposition frame was a SATIS 1200DLF equipment provided with a Weeco Mark II ion gun.

The layer thickness is controlled by means of a quartz microbalance.

The light transmission measurements through the glasses were conducted using a spectrophotometer marketed by Zeiss one hour after the glass preparation. It had been checked that the τV values obtained were stable by conducting a second measurement after one week.

2. Procedures

Examples 1 to 6

The method for producing optical articles does consists in introducing the substrate provided with an abrasion-resistant coating into a vacuum deposition chamber, in conducting a pumping step until a high vacuum was created, followed by a substrate surface activation step using a bombardment with an argon ion beam (IPC) under a pressure of $2.10^{-4}$ mBar (the ion gun was set to 3.0 A-150V), in stopping the ionic irradiation, in successively evaporating the required number of antireflection coating layers, in depositing the anti-smudge coating (top coat) at a rate ranging from 0.1 to 0.2 nm/s and lastly in ventilating.

Forming the antireflection coating does comprise a deposition step for the $SiO_2$ sub-layer at a rate of 1 nm/s (except for example 6: 1.2 nm/s), optionally (where indicated) under an $O_2$ atmosphere at a pressure of $1.10^{-4}$ mBar (except for example 6: $1.3.10^{-4}$ mBar), a surface activation step for the sub-layer using an argon ion beam at a pressure of $1.7.10^{-4}$ mBar for 30 seconds (same treatment as IPC already conducted directly on the substrate), stopping the ionic irradiation, depositing the first HI layer ($ZrO_2$) at a rate of 0.3 nm/s and optionally under an $O_2$ pressure of $6.10^{-5}$ mBar (only for example 6), depositing the first LI layer ($SiO_2$ or $SiO_2/Al_2O_3$) at a rate of 0.7 nm/s, depositing the second HI layer ($ZrO_2$ or $TiO_2$) at a pressure of $1.10^{-4}$ mBar (except for example 6: $O_2$ pressure of $6.10^{-5}$ mBar), with a rate ranging from 0.3 to 0.5 nm/s and with an oxygen ion assistance corresponding to 3.5 A-140V (except for example 6: no ion assistance), depositing a third HI layer (ZrO$_2$) at a rate of 0.3 nm/s (only for example 5), depositing an ITO layer at a rate ranging from 0.3 to 0.5 nm/s and with an oxygen ion assistance corresponding to 3.5 A-140 V (except for example 6: 2.0 A-120 V), and lastly depositing the second LI layer (SiO$_2$ or SiO$_2$/Al$_2$O$_3$) at a rate of 1 nm/s.

There was no pressure regulation by supplying gas into the chamber, especially no oxygen during the deposition of LI layers.

Comparative Examples C1 to C5

The procedures used in the comparative examples were similar. The articles for the comparative examples 1 and 2 (examples C1 and C2) did not comprise any sub-layer. The sub-layer of the articles for the comparative examples 3 to 5 (examples C3 to C5) had been deposited under oxygen atmosphere but did not undergo any ionic pre-cleaning step before depositing the multilayered stack.

3. Characterizations a. Characterization of the Abrasion Resistance

The abrasion resistance was evaluated by determining BAYER values on substrates provided with an sub-layer (except for examples C1 and C2) and with a multilayered stack.

BAYER Sand Test

Determining such a BAYER value was conducted in accordance with the ASTM Standard F 735.81. The higher the BAYER test value the stronger the abrasion resistance is.

This test consists in simultaneously stirring a glass sample and a glass specimen with an alternating movement in a tank comprising an abrasive powder (sand) with a defined particle size at a frequency of 100 cycles/minute during 2 minutes. The H diffusion measurement "before/after" of a glass sample was compared to that of a glass specimen, here a CR-39®-based bare glass for which the BAYER value was fixed to 1. The BAYER sand value corresponds to R=H glass specimen/H glass sample.

ISTM Bayer Test (Bayer Alumina)

Determining such a BAYER value was conducted according to the ASTM Standard F735-81, with following modifications:

Abrasion is conducted on 300 cycles using approximately 500 g of alumina (aluminum oxide Al$_2$O$_3$) ZF 152412 provided by Ceramic Grains (formerly Norton Materials, New Bond Street, PO Box 15137 Worcester, Mass. 01615-00137) instead of sand. The diffusion is measured by means of a Hazeguard system model XL-211 made by Pacific Scientific.

The ASTM Bayer value (Bayer sand) is considered to be satisfying when R is greater than or equal to 3.4 and is lower than 4.5. The ISTM Bayer value is considered to be satisfying when R is greater than or equal to 3 and is lower than 4.5. The Bayer sand value or ISTM value is considered as being excellent for values of 4.5 and above.

b. Characterization of the Adhesion for the Antireflection Stack on the Substrate (n×10 Blow Test)

The qualitative test known as the "n×10 blow" test makes it possible to evaluate the adhesion properties of a film deposited onto a substrate, in particular the adhesion of an antireflection coating to a substrate of an ophthalmic lens. It was conducted on the lens convex face in accordance with the procedure described in the world patent application WO 99/49097 using a number of strains equal to 50.

A stress (or cycle) consists in moving 10 times the eraser in a back and fro motion. The operator did visually check the condition of the examined lens every 3 stresses and up to 12 stresses, then every 20, 30, 40 and 50 stresses. The evaluation relies on the number of stresses the lens can bear until a defect appears. Therefore, the higher the obtained value for the n×10 blow test, the stronger the adhesion of the antireflection coating to the substrate is.

4. Results

The composition of the optical articles obtained in the examples 1 to 6 and in the comparative examples 1 to 5 is given in detail in Table 1 in the pages hereafter. This table also includes the measurement results for adhesion, transmission and abrasion resistance.

The lenses of the comparative examples 1 and 2 did not have any sub-layer. They obtained a low abrasion resistance.

The comparative example C3 relates to an article having an sub-layer that did not undergo any ionic bombardment before depositing the multilayered stack.

As regards the articles of comparative examples 4 and 5 that had an sub-layer, the obtained adhesion values in the "n×10 blow" test are limited.

Comparing the Bayer values obtained for the examples C3 and 2, C4 and 4 or C5 and 5 enables to observe the positive effect of the ionic bombardment on the surface of the sub-layer before depositing the multilayered stack from the abrasion resistance point of view.

Such treatment does typically increase the cohesion between the sub-layer and the multilayered stack of the invention.

The lenses of examples 2, 4, 5 and 6, which had a silica sub-layer deposited under O$_2$ pressure regulation and with an ionic bombardment of the surface of the sub-layer, obtained excellent ISTM Bayer values and adhesion values obtained for the "n×10 blow" test.

Comparing the results obtained for the examples 1 and 6 or 2 and 3 confirms that deposition of the sub-layer conducted in a vacuum chamber, in which a gas is supplied during said deposition, improves the mechanical properties (adhesion and/or abrasion resistance) of the antireflection stack.

Moreover, a comparison between the examples 4 and 5 revealed that using two juxtaposed TiO$_2$/ZrO$_2$ HI layers rather than a single TiO$_2$ layer does improve the abrasion resistance.

TABLE 1

| Comparative example 1 | |
|---|---|
| Substrate + hard coat | |
| ZrO$_2$ | 29 nm |
| SiO$_2$ | 23 nm |
| ZrO$_2$ | 68 nm |
| TIO | 7 nm |
| SiO$_2$ | 85 nm |
| Top coat | |
| Bayer sand | 4.0 |
| Bayer ISTM | 6.9 |
| n × 10 blow | 28 |
| τv (%) | 98 |

| Example 1 | |
|---|---|
| Substrate + hard coat | |
| SiO$_2$ (a) | 150 nm |
| ZrO$_2$ | 29 nm |
| SiO$_2$ | 23 nm |
| ZrO$_2$ | 68 nm |
| TIO | 7 nm |
| SiO$_2$ | 85 nm |

TABLE 1-continued

| Top coat | |
|---|---|
| Bayer sand | 6.9 |
| Bayer ISTM | 13.1 |
| n × 10 blow | >50 |
| τv (%) | 98.3 |

Comparative example 2

| Substrate + hard coat | |
|---|---|
| ZrO$_2$ | 29 nm |
| SiO$_2$/Al$_2$O$_3$ | 23 nm |
| ZrO$_2$ | 68 nm |
| TlO | 7 nm |
| SiO$_2$/Al$_2$O$_3$ | 85 nm |
| Top coat | |
| Bayer sand | 4.1 |
| Bayer ISTM | 7.4 |
| n × 10 blow | >50 |
| τv (%) | 97.1 |

Example 2

| Substrate + hard coat | |
|---|---|
| SiO$_2$ (a, b) | 150 nm |
| ZrO$_2$ | 29 nm |
| SiO$_2$/Al$_2$O$_3$ | 23 nm |
| ZrO$_2$ | 68 nm |
| TlO | 7 nm |
| SiO$_2$/Al$_2$O$_3$ | 85 nm |
| Top coat | |
| Bayer sand | 6.5 |
| Bayer ISTM | 11.4 |
| n × 10 blow | >50 |
| τv (%) | 97.4 |

Comparative example 3

| Substrate + hard coat | |
|---|---|
| SiO$_2$ (b) | 150 nm |
| ZrO$_2$ | 29 nm |
| SiO$_2$/Al$_2$O$_3$ | 23 nm |
| ZrO$_2$ | 68 nm |
| TlO | 7 nm |
| SiO$_2$/Al$_2$O$_3$ | 85 nm |
| Top coat | |
| Bayer sand | 5.9 |
| Bayer ISTM | 8.8 |
| n × 10 blow | >50 |
| τv (%) | 97.3 |

Example 3

| Substrate + hard coat | |
|---|---|
| SiO$_2$ (a) | 150 nm |
| ZrO$_2$ | 29 nm |
| SiO$_2$/Al$_2$O$_3$ | 23 nm |
| ZrO$_2$ | 68 nm |
| TlO | 7 nm |
| SiO$_2$/Al$_2$O$_3$ | 85 nm |
| Top coat | |
| Bayer sand | 8.2 |
| Bayer ISTM | 15.3 |
| n × 10 blow | 37 |
| τv (%) | 98.0 |

TABLE 1-continued

Comparative example 4

| Substrate + hard coat | |
|---|---|
| SiO$_2$ (b) | 150 nm |
| ZrO$_2$ | 24 nm |
| SiO$_2$/Al$_2$O$_3$ | 24 nm |
| TiO$_2$ | 98 nm |
| TlO | 13 nm |
| SiO$_2$/Al$_2$O$_3$ | 76 nm |
| Top coat | |
| Bayer sand | 4.3 |
| Bayer ISTM | 8.7 |
| n × 10 blow | 23 |
| τv (%) | 98.5 |

Example 4

| Substrate + hard coat | |
|---|---|
| SiO$_2$ (a, b) | 150 nm |
| ZrO$_2$ | 24 nm |
| SiO$_2$/Al$_2$O$_3$ | 24 nm |
| TiO$_2$ | 98 nm |
| TlO | 13 nm |
| SiO$_2$/Al$_2$O$_3$ | 76 nm |
| Top coat | |
| Bayer sand | 5.3 |
| Bayer ISTM | 10.6 |
| n × 10 blow | >50 |
| τv (%) | 98.3 |

Comparative example 5

| Substrate + hard coat | |
|---|---|
| SiO$_2$ (b) | 150 nm |
| ZrO$_2$ | 24 nm |
| SiO$_2$/Al$_2$O$_3$ | 30 nm |
| TiO$_2$ | 101 nm |
| ZrO$_2$ | 12 nm |
| TlO | 7 nm |
| SiO$_2$/Al$_2$O$_3$ | 78 nm |
| Top coat | |
| Bayer sand | 5.1 |
| Bayer ISTM | 8.6 |
| n × 10 blow | 35 |
| τv (%) | 98.5 |

Example 5

| Substrate + hard coat | |
|---|---|
| SiO$_2$ (a, b) | 150 nm |
| ZrO$_2$ | 24 nm |
| SiO$_2$/Al$_2$O$_3$ | 30 nm |
| TiO$_2$ | 101 nm |
| ZrO$_2$ | 12 nm |
| TlO | 7 nm |
| SiO$_2$/Al$_2$O$_3$ | 78 nm |
| Top coat | |
| Bayer sand | 6.2 |
| Bayer ISTM | 12.6 |
| n × 10 blow | >50 |
| τv (%) | 98.6 |

TABLE 1-continued

Example 6

Substrate + hard coat

| SiO₂ (a, b) | 150 nm |
|---|---|
| ZrO₂ | 29 nm |
| SiO₂ | 23 nm |
| ZrO₂ | 68 nm |
| ITO | 7 nm |
| SiO₂ | 85 nm |

Top coat

| Bayer sand | 8.0 |
|---|---|
| Bayer ISTM | 15.0 |
| n × 10 blow | >50 |
| τv (%) | 98.1 |
| $R_m$ (%) | 0.76 |

The sub-layer appears in grey.
(a) Ionic bombardment treatment before depositing the next layer.
(b) Oxygen supply during deposition.

The invention claimed is:

1. A method for producing an optical article having antireflection or reflective properties, comprising:
   providing an optical article comprising a substrate having at least one main surface;
   depositing onto a main surface of the substrate a sub-layer having an exposed surface, said sub-layer comprising an SiO₂-based layer including a thickness greater than or equal to 75 nm and lower than 250 nm, wherein the deposition of said SiO₂-based layer is conducted without ion assistance by evaporation of SiO₂ in a vacuum chamber in which at least one supplementary gas is supplied during said deposition, under a pressure of $8.10^{-5}$ to $1.5 \times 10^{-4}$ mbar, wherein said at least one supplementary gas comprises oxygen;
   depositing onto said exposed surface of the sub-layer a multilayered antireflection or reflective stack comprising at least one high refractive index layer and at least one low refractive index layer; and
   recovering an optical article comprising a substrate having a main surface coated with an antireflection or a reflective coating comprising said sub-layer and said multilayered stack,
   wherein the exposed surface of the sub-layer has been submitted to an ionic bombardment treatment prior to depositing said multilayered stack, and
   wherein the deposition of the low refractive index layers of the multilayered stack is conducted in a vacuum chamber with no gas supply to the vacuum chamber during said coating deposition.

2. The method of claim 1, wherein the optical article has antireflection properties.

3. The method of claim 1, wherein the SiO₂-based layer has a thickness of greater than or equal to 100 nm.

4. The method of claim 1, wherein the sub-layer consists of said SiO₂-based layer.

5. The method of claim 4, wherein the sub-layer consists of SiO₂.

6. The method of claim 1, wherein said SiO₂-based layer is free from Al₂O₃.

7. The method of claim 1, wherein the sub-layer comprises an SiO₂ layer with a thickness that is greater than or equal to 75 nm and that is free from Al₂O₃ and at most three layers are between the substrate and the SiO₂ layer that is free from Al₂O₃.

8. The method of claim 1, wherein the SiO₂-based layer directly contacts the multilayered stack.

9. The method of claim 1, wherein deposition of the SiO₂-based layer is conducted without concomitant treatment with an energetic species.

10. The method of claim 1, wherein a treatment step with energetic species is conducted concomitantly to depositing one or more of the various layers of the antireflection coating or reflective coating.

11. The method of claim 1, wherein all the low refractive index layers of the multilayered stack comprise a mixture of SiO₂ and Al₂O₃.

12. The method of claim 11, wherein the layers comprising a mixture of SiO₂ and Al₂O₃ contain from 1 to 10% Al₂O₃ as related to the total weight of SiO₂+Al₂O₃ in these layers.

13. The method of claim 1, wherein all the antireflection or reflective coating layers are deposited by evaporation under vacuum.

14. The method of claim 1, wherein the high refractive index layers of the multilayered stack comprise at least one of TiO₂, PrTiO₃, or ZrO₂.

15. The method of claim 1, wherein the multilayered stack comprises at least one electrically conductive layer.

16. The method of claim 15, wherein the electrically conductive layer comprises at least one of indium oxide, tin oxide, zinc oxide, or indium-tin oxide.

17. The method of claim 1, wherein the optical article is an ophthalmic lens.

18. The method of claim 1, wherein the multilayered stack directly contacts the sub-layer.

19. The method of claim 1, wherein the sub-layer is a bi-layer stack consisting of a SiO₂-based layer deposited on a layer having a high refractive index.

20. The method of claim 1, wherein the sub-layer is a 3-layer stack consisting of a SiO₂-based layer deposited on a layer having a high refractive index, which is deposited on a low refractive index SiO₂-based layer.

21. The method of claim 1, wherein the deposition of said SiO₂-based layer is conducted under a pressure of $8.10^{-5}$ to $1.3 \times 10^{-4}$ mbar.

22. The method of claim 1, wherein the deposition of said SiO₂-based layer is conducted under a pressure of $8.10^{-5}$ to $1.10^{-4}$ mbar.

23. The method of claim 1, wherein the adhesion of the antireflection or reflective stack is such that the optical article, when submitted to the n×10 blow test, resists to a number of stresses higher than or equal to 12.

24. The method of claim 1, wherein the adhesion of the antireflection or reflective stack is such that the optical article, when submitted to the n×10 blow test, resists to a number of stresses higher than or equal to 20.

* * * * *

UNITED STATES PATENT AND TRADEMARK OFFICE
CERTIFICATE OF CORRECTION

PATENT NO. : 8,846,140 B2  Page 1 of 1
APPLICATION NO. : 13/657569
DATED : September 30, 2014
INVENTOR(S) : Philippe Roisin and Michele Thomas It is certified that error appears in the above-identified patent and that said Letters Patent is hereby corrected as shown below:

On the title page, Item (73) Assignee, line 2:

Please delete "Paris (FR)" and replace with -- Charenton-Le-Pont (FR) --.

Signed and Sealed this
Seventeenth Day of February, 2015

Michelle K. Lee
*Deputy Director of the United States Patent and Trademark Office*